US012566188B2

(12) United States Patent
    Koh et al.

(10) Patent No.: US 12,566,188 B2
(45) Date of Patent: Mar. 3, 2026

(54) ANALYTE COLLECTING DEVICE, AND ANALYTE COLLECTING METHOD AND ANALYTE INSPECTION SYSTEM USING SAME

(71) Applicant: ALIGNED GENETICS, INC., Anyang-si (KR)

(72) Inventors: Ghun Koh, Anyang-si (KR); Su-Bong Lee, Anyang-si (KR); Yeoncheol Jung, Anyang-si (KR)

(73) Assignee: Aligned Genetics, Inc., Anyang-si (KR)

( * ) Notice: Subject to any disclaimer, the term of this patent is extended or adjusted under 35 U.S.C. 154(b) by 1072 days.

(21) Appl. No.: 17/440,106

(22) PCT Filed: Apr. 14, 2020

(86) PCT No.: PCT/KR2020/005045
    § 371 (c)(1),
    (2) Date: Sep. 16, 2021

(87) PCT Pub. No.: WO2020/213930
    PCT Pub. Date: Oct. 22, 2020

(65) Prior Publication Data
    US 2022/0187330 A1     Jun. 16, 2022

(30) Foreign Application Priority Data
    Apr. 16, 2019     (KR) ......................... 10-2019-0044545

(51) Int. Cl.
    *G01N 35/00*     (2006.01)
    *G01N 35/10*     (2006.01)

(52) U.S. Cl.
    CPC ......... *G01N 35/0098* (2013.01); *G01N 35/10* (2013.01); *G01N 2035/00306* (2013.01); *G01N 2035/00564* (2013.01)

(58) Field of Classification Search
    None
    See application file for complete search history.

(56) References Cited

U.S. PATENT DOCUMENTS 4,326,540 A * 4/1982 Bailey .................... A61B 5/153
                                                            604/222
4,871,683 A * 10/1989 Harris ..................... B01L 3/502
                                                            436/807
(Continued)

FOREIGN PATENT DOCUMENTS

EP            3327444 A1    5/2018
JP        S53-024682 U1    3/1978
            (Continued)

OTHER PUBLICATIONS

Notice of Allowance received in KR Application No. 10-2019-0044545 dated Feb. 5, 2025.
(Continued)

*Primary Examiner* — Matthew D Krcha
(74) *Attorney, Agent, or Firm* — Knobbe, Martens, Olson & Bear, LLP

(57) ABSTRACT

This application relates to an analyte collecting device, an analyte collecting method and an analyte inspection system using the same. In one aspect, the device includes a case including an opening and an internal space. The device may also include a piston including one or more partition walls dividing the internal space into a plurality of internal spaces.

(Continued)

10

The piston may be inserted into the internal space through the opening of the case to reciprocate in the internal space.

19 Claims, 9 Drawing Sheets

(56)                References Cited

U.S. PATENT DOCUMENTS

| | | | |
|---|---|---|---|
| 6,251,660 B1 | 6/2001 | Muir et al. | |
| 2004/0018577 A1* | 1/2004 | Emerson Campbell | ..................... G01N 33/6893 435/7.93 |
| 2004/0241659 A1* | 12/2004 | Cox | ......................... B01L 3/502 435/6.12 |
| 2013/0029324 A1 | 1/2013 | Rajagopal et al. | |
| 2014/0276039 A1 | 9/2014 | Cowan et al. | |
| 2015/0232916 A1 | 8/2015 | Rasmussen et al. | |
| 2016/0090619 A1 | 3/2016 | Murayama | |
| 2016/0108356 A1* | 4/2016 | Shor | ...................... C12M 37/04 435/308.1 |

FOREIGN PATENT DOCUMENTS

| | | |
|---|---|---|
| KR | 10-2014-0045852 A | 4/2014 |
| KR | 10-2016-0021176 A | 2/2016 |
| WO | WO 2006/114608 A1 | 11/2006 |
| WO | WO 2013/059438 A1 | 4/2013 |
| WO | 2020132279 A1 | 6/2020 |
| WO | 2021/086444 A1 | 5/2021 |

OTHER PUBLICATIONS

Office Action received in KR Application No. 10-2019-0044545 dated Jun. 10, 2024.

Examination Report of Australian Patent application No. 2020258915 (issued on Sep. 9, 2022).

First Examination Report of Indian patent application No. 202117046212 (issued on Mar. 31, 2022).

Notice of Reasons for Refusal of Japanese patent application No. 2021-561652 (drafted Nov. 7, 2022).

Extended European Search Report of corresponding European patent application No. 20791672.7 (issued on Nov. 24, 2022).

Office Action in BR Application No. 112021020767-8 dated Mar. 20, 2024 and English Translation.

Second Office Action in Chinese Application No. 202080028476.X dated Apr. 20, 2024 in 14 pages.

International Search Report mailed Aug. 10, 2020 in International Application No. PCT/KR2020/005045, in 5 pages.

* cited by examiner

ANALYTE COLLECTING DEVICE, AND ANALYTE COLLECTING METHOD AND ANALYTE INSPECTION SYSTEM USING SAME

The present application is a U.S. national phase application under 35 U.S.C. § 371 of International Application No. PCT/KR2020/005045, filed on Apr. 14, 2020, which claims the benefit of Korean Patent Application No. 10-2019-0044545 filed on Apr. 16, 2019 in the Korean Intellectual Property Office, the entire disclosure of each of which is incorporated herein by reference.

FIELD OF THE DISCLOSURE

The present disclosure relates to an analyte collecting device, and an analyte collecting method and an analyte inspection system using the same.

RELATED ART

In general, samples obtained from a human body or the body of animal are refined and then undergo a predetermined examination in a laboratory in some cases. In this case, generally, preprocessing and processing such as refinement are performed on a sample, and the refined sample may be finally collected as analyte and a predetermined test may be performed. As an example of an analyte collecting device and method, and an analyte inspection system, a device and method of refining nucleic acid and a system for examining the refined nucleic acid may be exemplified.

Refinement of nucleic acid, which is a necessary technique that is widely used in the fields of genetic engineering and molecular biology, is a very important technique in terms of study, medical treatment, and industry as a prepro-cessing stage for techniques such as Southern blot, Northern blot, and polymerase chain reaction (PCR). Such refinement of nucleic acid is conventionally achieved through chemical and physical method that use ultrasonic waves, heat, pro-teinase, alcohols, a special reagent, etc. and researchers perform a nucleic acid refinement process using a pipette. However, recently, methods of more conveniently refining nucleic acid using magnetic particles have been introduced in a wide filed. However, these methods should be per-formed in laboratories, require a large amount of time and manpower, and have limitation to be generally used.

A process of refining nucleic acid includes stages such as dissolving (lysis) of biomaterials such as a cell, nucleic acid-magnetic particle binding, washing, and elution, and requires reagents and treatments suitable for each of the stages. An analyte that has undergone such a refinement process can be collected by a predetermined amount and predetermined necessary tests can be performed on the analyte. That is, refined nucleic acid is moved into a trans-parent amplification and detection tube and is amplified by real-time PCR or similar techniques, whether there is patho-genic nucleic acid is optically detected using fluorescent labeling, and accordingly, it is possible to diagnose corre-sponding diseases.

An analyte collection device for refining and collecting a sample as an analyte in a predetermined quantity should require minimum manpower for the refinement process, should be filled with a predetermined solution for refine-ment, and should be small to secure mobility, in order to reduce power of a hospital and perform point-of-care testing (POCT). Further, disposability should be secured to prevent contamination by biomaterials, so the device needs to be implemented at a low cost. However, there are little study about an analyte collection device, a method using the analyte collection device, and a system for examining an analyte that completely satisfies those conditions.

PRIOR ART DOCUMENT

US 2015-0232916 A1 (2015.08.20)

SUMMARY

Embodiments of the present disclosure provide an analyte collecting device that can be achieved at a low cost, can be achieved in a small size, and can efficiently process a sample through an automated process in order to refine and pre-process a sample using magnetic particles, and an analyte collecting method and a system for examining an analyte using the analyte collecting device.

In accordance with a first aspect of the present disclosure, there is provided an analyte collecting device including: a case including an opening and an internal space; and a piston including one or more partition walls dividing the internal space into a plurality of internal spaces, the piston being inserted into the internal space through the opening of the case to reciprocate in the internal space.

The case may include: an exhaust port formed at an end portion opposite to a side in which the piston is inserted such that the internal space communicates with an outside, a sample put in the internal space being discharged through the exhaust port to the outside of the case; and a blowback portion provided at the opposite end portion to the side in which the piston is inserted, the blowback portion including a flow hole formed such that both ends thereof communicate with the internal space.

The internal space may be filled with a solution contain-ing a magnetic substance, and the sample input in the internal space may be discharged through the exhaust port as an analyte after undergoing predetermined processing by the solution in the internal space.

The one or more partition walls may include four partition walls, the plurality of internal spaces may include a first section, a second section, a third section, and a fourth section sequentially divided by the four partition walls, the first section to the fourth section being sequentially disposed away from the opening of the case, the first section may be filled with a solution that dissolves a biomaterial contained in the sample and binds at least a portion of an analyte in the biomaterial to the magnetic substance, the second section may be filled with a solution that washes at least a portion of the analyte bonded to the magnetic substance, the third section may be filled with a solution that elutes at least a portion of the analyte bonded to the magnetic substance from the magnetic substance, and the fourth section may be formed adjacent to the third section and in contact with an inner end of the case.

The solution filled in the first section may include at least one of a lysis/binding buffer and isopropyl alcohol (2-pro-panol), the solution filled in the second section may include a washing buffer, and the solution filled in the third section may include an elution buffer.

The piston may include a center column. The one or more partition walls may include a plurality of partition walls spaced apart from each other and radially extend from the circumferential surface of the center column, and the inter-nal space may be divided into a plurality of sections by the partition walls and at least some of the divided plurality of sections may be filled with different solutions.

The piston may further include: a flange attached to at least one of two surfaces of each of the one or more partition walls provided perpendicular to an insertion direction of the piston, the flange having a circumferential surface provided closer to an inner wall surrounding the internal surface of the case than the circumferential surface of each of the one or more partition walls; and a sealing member provided to surround the circumferential surface of each of the one or more partition walls and being in contact with the inner wall of the case.

The case may further include: a specimen injection port including an injection hole formed at the case to allow the internal space to communicate the outside of the case so that a sample can be injected. The specimen injection port may further include a cap sealing the injection hole by selectively covering the injection hole.

An aggregating groove may be recessed from an inner wall forming the internal space of the case, the internal space may be filled with a solution containing a magnetic substance, and the magnetic substance may be aggregated in the aggregating groove when a magnetic force is applied toward the aggregating groove from the outside.

The analyte that is collected by the analyte collecting device may include at least one of nucleic acid, protein, vesicle, lipid, a carbohydrate, a cell, and a substance separated therefrom.

In accordance with a second aspect of the present disclosure, there is provided a system for examining an analyte, the system including: an analyte collecting device including a case including an opening and an internal space, and a piston including one or more partition walls dividing the internal space into a plurality of internal spaces, the piston being inserted into the internal space through the opening of the case to reciprocate in the internal space; and a holder separably holding the analyte collecting device.

The system may further include: a plunger for translating the piston in the internal space by pushing or pulling a head of the piston; and a controller. The plunger may be controlled by the controller.

The internal space may be filled with a solution containing a magnetic substance, predetermined processing may be performed on a sample put in the case by the solution filled in the internal space, and the predetermined processing may include a plurality of stages which are sequentially performed as the controller controls operation of the plunger.

The case may include: an exhaust port formed at an end portion opposite to a side in which the piston is inserted such that the internal space communicates with an outside, a sample, which is put in the internal space and undergoes the predetermined processing, being discharged from the case as an analyte; and a blowback portion provided at the opposite end portion to the side in which the piston is inserted, the blowback portion including a flow hole formed such that both ends thereof communicate with the internal space. The controller may control the plunger to push the piston toward the blowback portion such that the analyte is discharged through the exhaust port by a blowback phenomenon.

The case may have an aggregating groove recessed from an inner wall forming the internal space, and the system may further include: an aggregating device configured to selectively apply a magnetic force toward the aggregating groove so that the magnetic substance is aggregated in the aggregating groove, the aggregating device being controlled by the controller.

The system may further include: a de-aggregating device configured to selectively apply a magnetic force to the internal space and being controlled by the controller. The controller may control the de-aggregating device with the magnetic substance aggregated in the aggregating groove so that a magnetic force is applied to the internal space and the magnetic substance aggregated in the aggregating groove is separated.

The analyte that is collected by the analyte collecting device may include at least one of nucleic acid, protein, vesicle, lipid, a carbohydrate, a cell, and a substance separated therefrom.

In accordance with a third aspect of the present disclosure, there is provided a method of collecting analyte using an analyte collecting device including: a case including an opening and an internal space; and a piston including one or more partition walls dividing the internal space into a plurality of internal spaces, the piston being inserted into the internal space of the case to reciprocate in the internal space, the method including: putting a sample in the internal space; and collecting the sample as an analyte by sequentially performing a predetermined processing including a plurality of stages while the piston is moved in the internal space.

The case may include: an exhaust port formed at an end portion opposite to a side in which the piston is inserted such that the internal space communicates with an outside, the sample accommodated in the internal space being discharged through the exhaust port to the outside of the case; and a blowback portion provided at the opposite end portion to the side in which the piston is inserted, the blowback portion including a flow hole formed such that both ends thereof communicate with the internal space. The method may further include discharging the analyte in which the piston moving in the internal space pushes a section contained an analyte undergoing the predetermined processing toward the blowback portion formed at an end portion of the case, and the analyte pressed through the blowback portion is discharged through an exhaust port formed at the case.

An aggregating groove may be recessed from an inner wall forming the internal space of the case, and a magnetic substance is contained in a solution filled in the internal space. The method may further include aggregating the magnetic substance in the aggregating groove by applying a magnetic force to the aggregating groove.

The one or more partition walls may include four partition walls, the plurality of internal spaces include a first section, a second section, a third section, and a fourth section sequentially divided by the four partition walls, the first section of the four sections may be formed closest to an opening of the case, the second section may be formed adjacent to the first section with one of the partition walls therebetween, the third section may be formed adjacent to the second section with one of the partition walls therebetween, and the fourth section may be formed adjacent to the third section with one of the partition walls therebetween to be in contact with an inner end of the case, the sample may be put in the first section, and the sequentially performing the predetermined processing may further include: bonding at least a portion of an analyte in a biomaterial contained in the sample to the magnetic substance by dissolving the biomaterial by the solution filled in the first section, disposing the second section above the aggregating groove by moving the piston backward after the magnetic substance bound to at least a portion of the analyte is aggregated in the aggregating groove by applying a magnetic force to the aggregating groove, floating the magnetic substance in the second section in which the magnetic force applied to the aggregating groove is removed, and the magnetic substance aggregated in the aggregating groove is separated and floats into the second section by applying a magnetic force to the internal space; washing at least a portion of the analyte bound to the magnetic substance by a solution filled in the second section; disposing the third section above the aggregating groove by moving the piston backward after the magnetic substance bound to at least a portion of the analyte is aggregated in the aggregating groove by applying a magnetic force to the aggregating groove; floating the magnetic substance in the third section in which the magnetic force applied to the aggregating groove is removed, and the magnetic substance aggregated in the aggregating groove is separated and floats into the third section by applying a magnetic force to the internal space; eluting at least a portion of the analyte bound to the magnetic substance from the magnetic substance by a solution filled in the third section; and aggregating the magnetic substance with at least a portion of the analyte eluted in the aggregating groove by applying a magnetic force to the aggregating groove.

The solution filled in the first section may include at least one of a lysis/binding buffer and isopropyl alcohol (2-propanol), the solution filled in the second section includes a washing buffer, and the solution filled in the third section includes an elution buffer.

The analyte that is collected by the analyte collecting device may include at least one of nucleic acid, protein, vesicle, lipid, a carbohydrate, a cell, and a substance separated therefrom.

According to embodiments of the present disclosure, since processing such as refinement, amplification, detection can be automatically performed without intervention of a user after a sample is put in the device, there is an effect that usability is high, secondary infection of a user or a third party can be prevented when the sample is processed.

Further, since the analyte that finishes being refined can be automatically conveyed, a user does not intervene in movement of a solution for the next reaction, so there is an effect that sample-to-answer can be implemented and carryover contamination can be prevented.

Further, there is an effect that a yield ratio an analyte is prevented from changing depending on the skill of users and it is possible to achieve a constant yield ratio of an analyte every time.

Further, there is an effect that the structure of the device is simplified, the components can be minimized, the cost is reduced by downsizing, and spatial usability can be increased.

Further, since it is possible to add a plurality of refining stages in one device, there is an effect that multiple specimens can be processed and detected.

BRIEF DESCRIPTION OF THE DRAWINGS

FIG. 2 is a cross-sectional view taken along line II-II of FIG. 1.

FIG. 3 is a conceptual diagram showing a system for examining an analyte including the analyte collecting device of FIG. 1.

DESCRIPTION OF EXEMPLARY EMBODIMENTS

Hereinafter, specific embodiments for implementing a spirit of the present disclosure will be described in detail with reference to the drawings.

In describing the present disclosure, detailed descriptions of known configurations or functions may be omitted to clarify the present disclosure.

When an element is referred to as being 'connected' to, or 'contacted' with another element, it should be understood that the element may be directly connected to, or contacted with another element, but that other elements may exist in the middle.

The terms used in the present disclosure are only used for describing specific embodiments, and are not intended to limit the present disclosure. Singular expressions include plural expressions unless the context clearly indicates otherwise.

Hereafter, an analyte collecting device and a system for examining an analyte according to an embodiment of the present disclosure are described with reference to the drawings.

Figure 1:
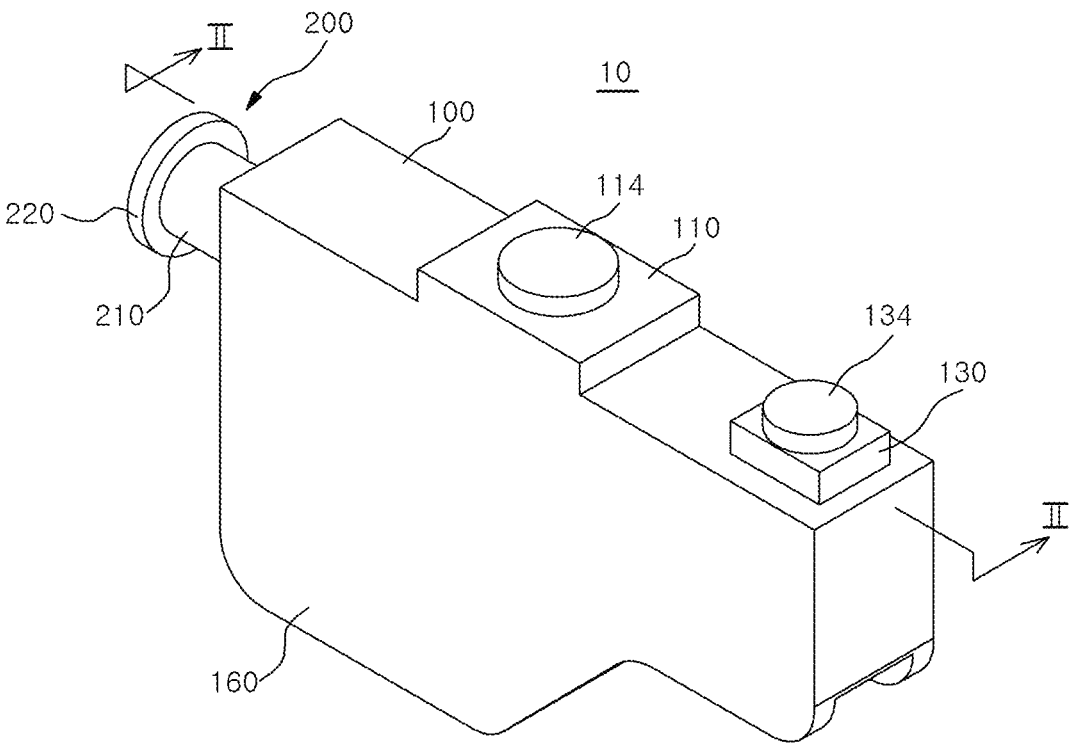
FIG. 1 is a perspective view showing an analyte collecting device according to an embodiment of the present disclosure.
Figure 2:
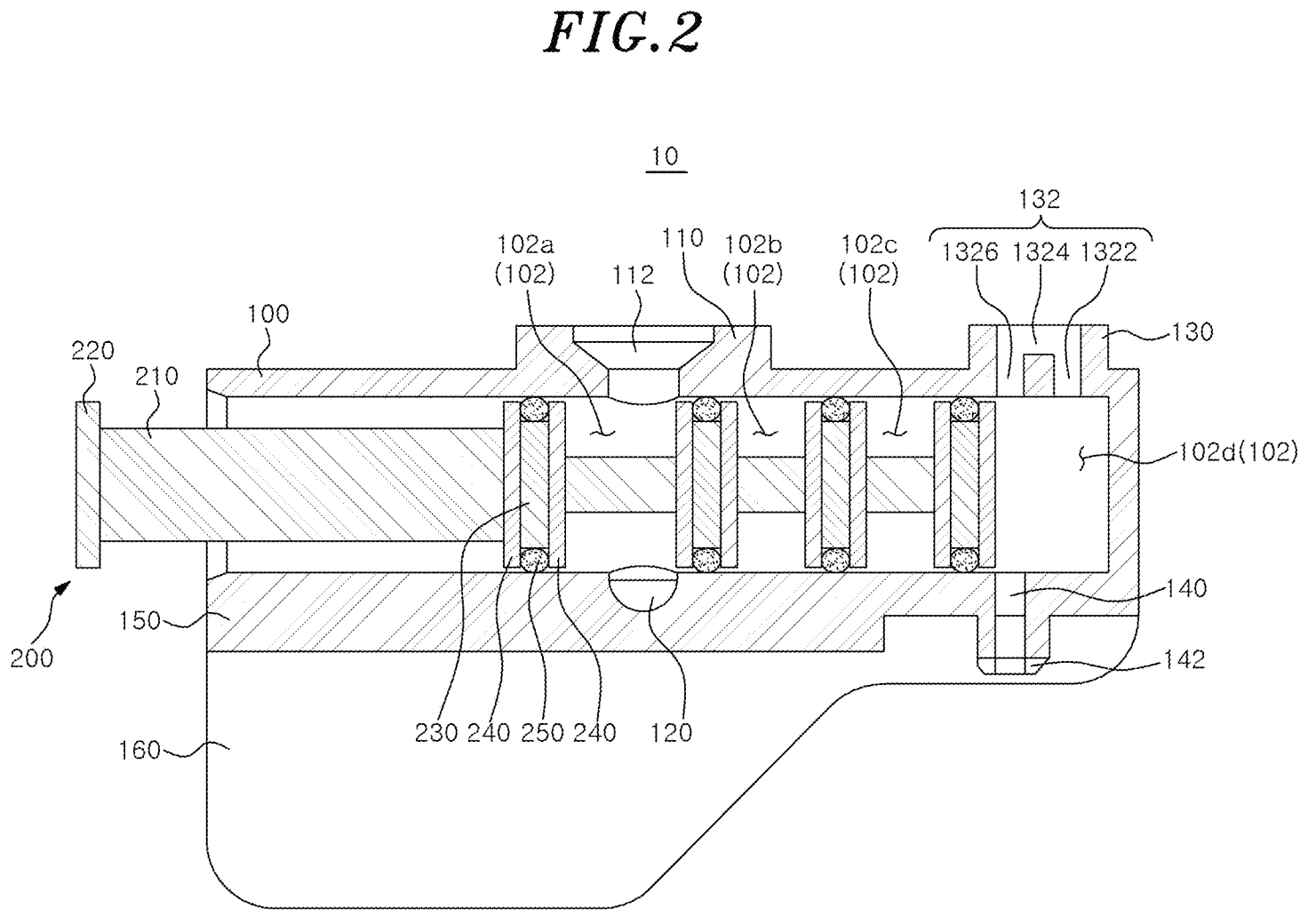

Referring FIGS. 1 and 2, an analyte collecting device 10 according to an embodiment of the present disclosure may include, in a broad meaning, a case 100 and a piston 200. The case 100 and the piston 200, for example, may be made of any one material of plastic, rubber, ceramic, an inorganic compound, and metal, or a combination thereof. The case 100 and the piston 200, for example, may be manufactured through processes such as blow molding, compression molding, extrusion molding, injection molding, laminating, reaction injection molding, matrix molding, rotational molding, spin casting, transfer molding, thermoforming, and 3D printing. Further, the case 100 and the piston 200 can be manufactured in a large quantity, for example, as disposables by an existing automated facility. Further, the case 100 and the piston 200 may be individually manufactured and assembled to be provided.

The case has a space 102 therein in which a sample can be put, a piston 200 may be inserted and assembled to each other in the internal space 102. The internal space 102 of the case 100 may be provided in a shape with one side thereof opened and may be formed in a shape corresponding to the piston 200 so that the piston 200 can be inserted and reciprocated in the internal space 102. Further, the internal space 102 of the case 100 may be divided into a plurality of sections by partition walls 230 of the piston 200. For example, the internal space 102 of the case 100 may be divided into a total of four sections 102a, 102b, 102c, and 102d, but the spirit of the present disclosure is not limited thereto.

A sample that is put into the internal space 102 may be liquid, solid, of a mixture including some or all of a cell, a virus, a tissue, exosome, protein, nucleic acid, an antigen, and an antibody, and for example, may be a specimen taken from a human body. When the sample that is put into the internal space 102 is a specimen taken from a human body, for example, the nucleic acid in cells existing in the sample may be refined using the analyte collecting device 10.

Further, the internal space 102 may be filled with a solution containing a magnetic substance and the plurality of sections may be filled with different solutions. For example, when the internal space 102 is divided into a total of four sections 102*a*, 102*b*, 102*c*, and 102*d*, the first section 102*a* may be formed closest to the case 100 formed such that the piston 200 can be inserted therein, among the four sections 102*a*, 102*b*, 102*c*, and 102*d*, and the first section 102*a* may be filled with a solution for binding at least a portion of the analyte, which is in a biomaterial contained in the sample, to a magnetic substance through dissolution of the biomaterial.

For example, an analyte that is collected by the analyte collecting device 10 may be nucleic acid, protein, vesicle (exosome, etc.), lipid, a carbohydrate, a cell (a blood cell, an immunocyte, an oncocyte, pathogenic bacteria, etc.) and may include a biomaterial itself contained in a sample or a substance that can be physically and/or chemically separated from the biomaterial. Further, for example, when the nucleic acid in cells existing in a sample is refined by the analyte collecting device 10, the analyte that is collected by the analyte collecting device 10 may include nucleic acid.

The solution that fills the first section 102*a* may include, for example, at least one of a lysis/binding buffer and 2-Propanol, and more particularly, may be provided as a solution including some or all of magnetic nano/micro particles, salts (ex. Tris-HCl), chelating agent (ex. ethylenediaminetetraacetic acid (EDTA)), a detergent (ex. Sodium dodecyl sulfate (SDS) and Triton X-100), a reductant (ex. Dithiothreitol (DTT), a chaotropic agent (ex. Guanidine thiocyanate), enzyme (ex. Proteinase K), alcohol (ex. 2-Propanol), and distilled water.

Further, the second section 102*b* is formed adjacent to the first section 102*a* with one of the plurality of partition walls 230 therebetween, and the second section 102*b* may be filled with a solution that enables washing of at least a portion of the analyte bound to a magnetic substance.

The solution that fills the second section 102*b*, for example, may include washing buffer, and more particularly, may be provided as a solution including some or all of diethyl pyrocarbonate (DEPC), sodium citrate tribasic dehydrate, alcohol (ex. Ethanol, 2-propanol), and distilled water.

Further, the third section 102*c* is formed adjacent to the second section 102*b* with one of the plurality of partition walls 230 therebetween, and the third section 102*c* may be filled with a solution that enables at least a portion of the analyte bound to a magnetic substance to be eluted from the magnetic substance.

The solution that fills the third section 102*c*, for example, may include an elution buffer, and more particularly, may be provided as a solution including some or all of salts (ex. Tris-HCl), a chelating agent (ex. Ethylenediaminetetraacetic acid (EDTA), diethyl pyrocarbonate (DEPC), and distilled water.

Further, the fourth section 102*d* may be formed adjacent to the third section 102*c* with one of the plurality of partition walls 230 therebetween and may be formed in contact with an inner end positioned opposite to the opening of the case 100. The fourth section 102*d* may be filled with gas such as air.

Meanwhile, the case 100 may include a specimen injection port 110, an aggregating groove 120, a blowback portion 130, an exhaust port 140, a bed 150, and wings 160.

The specimen injection port 110 may include an injection hole 112 formed at the case 100 to connect the internal space

102 and the outside of the case 100 so that a sample can be injected, and may further include a cap 114 sealing the injection hole 112 by selectively covering the injection hole 112.

The injection hole 112 may be formed in a shape of which the top is wide and is narrowed downward, and for example, may be formed on a conical shape, but the spirit of the present disclosure should not be construed as being limited to the shape of the injection hole 112. Further, the injection hole 112 may be recessed with respect to a top surface of the case 100 so that the lower end of the injection hole 112 may communicates with the internal space 102. However, this is only an example and the injection hole 112 may be formed on a side surface or the bottom surface other than the top surface of the case 100.

Further, as the piston 200 is moved in one direction in the internal space 102, the lower end of the injection hole 112 can be sequentially communicated with the sections 102*a*, 102*b*, 102*c*, and 102*d*. When a sample is injected through the injection hole 112, basically, the sample may be injected while the injection hole 112 communicates with the first section 102*a*, and the first stage of the refinement process may be performed immediately after the sample is injected into the first section 102*a*.

The cap 114 may be made of an elastic material, for example, rubber, and the lower end thereof is formed to correspond to the shape of the injection hole 112 such that when the lower end is inserted in the injection hole 112, the cap can completely cover and seal the injection hole 112. The cap 114 can prevent external foreign substances from permeating into the internal space 102 by sealing the injection hole 112 when the device is not used, and the cap 114 may be separated from the injection hole 112 and the injection hole 112 may be opened so that a sample can be injected into the injection hole 112. After a sample is injected through the injection hole 112, the cap 114 is coupled again, so the injection hole 112 can be sealed. Accordingly, it is possible to prevent foreign substances from permeating into the internal space not only before processing, but while processing is performed.

The aggregating groove 120 is recessed from an inner wall forming the internal space 102, and when a magnetic force is applied toward the aggregating groove 120 from the outside, the magnetic substance in the internal space 102 can be aggregated in the aggregating groove 120. In this case, dissolution and a binding action of the sample occur in the first section 102*a*, so when the magnetic substance and another biomaterial are bound, the magnetic substance and the material bound to the magnetic substance can be aggregated in the aggregating groove 120.

Further, the aggregating groove 120 may be formed on an inner wall of the case 100 not to interfere with the injection hole 112, and in this embodiment, the aggregating groove 120 is exemplified as being form on the bottom surface of the internal space 102 of the case, but the spirit of the present disclosure is not limited thereto. For example, the aggregating groove 120 may be formed on a side surface or the top surface of the internal space 102. Further, the aggregating groove 120 may be formed as a semispherical shape, but the spirit of the present disclosure is not construed to be limitative due to the shape of the aggregating groove 120, and the aggregating groove 120 may be formed in other shapes such as a conical shape and a hexahedron shape, depending on cases.

Further, the aggregating groove 120 may be formed on the same line as the injection hole 112. Alternatively, the aggregating groove 120 may be formed at a position within a range in which the aggregating groove 120 and the injection hole 112 both can be communicated with at least the first section 102a. Accordingly, a sample injected through the injection hole 112 can be accommodated and aggregated in the aggregating groove 120 without additional movement of the piston 200. However, this is only an example, and even if the aggregating groove 120 is formed at a position where the aggregating groove 120 cannot be communicated with both of the injection hole 112 and any one of the sections 102a, 102b, 102c, and 102d, a sample can be aggregated by the additional movement of the piston 200.

The blowback portion 130 is provided at an end opposite to a side in which the piston 200 is inserted and includes a flow hole 132 having both ends communicated with the internal space. Further, the blowback portion 130 may be formed on the top of the case 10, but the spirit of the present disclosure is not limited thereto, and the blowback portion 130 may be formed on a side or the bottom of the case 100. When the piston 200 is moved forward toward the blowback portion 130, the gas such as air existing in the fourth section 102d is blown back to the flow hole 132 by the blowback portion 130, so the analyte that finishes being refined and exists in the third section 102c can be discharged through the exhaust port 140 and collected in a collection container X (see, FIG. 3).

To this end, the flow hole 132 includes a flow hole inlet 1322, a bridge 1324, and a flow hole outlet 1326. Each of the flow hole inlet 1322 and the flow hole outlet 1326 is formed such that an end thereof is communicated with the internal space 102, and other end thereof is connected through the bridge 1324, so that the entire flow hole 132 may be formed as an U-shaped channel. In this case, the flow hole inlet 1322 may be formed closer to the end opposite to the opening of the internal space 102 than the flow hole outlet 1326. Accordingly, when the piston 200 is moved forward to narrow the fourth section 102d, the gas such as air in the fourth section 102d flows into the flow hole inlet 1322 by pressure, and can pass through the bridge 1324 and the flow hole outlet 1326 and then flow into the third section 102c adjacent to the fourth section 102d. The analyte accommodated in the third section 102c can be pushed through the exhaust port 140 by the pressure of the inflow gas and can be discharged from the case 100. The analyte discharged as described above can be collected in the collection container X coupled to a container coupling protrusion 142 to be described below.

Due to the configuration of the blowback portion 130, a user can finely adjust the amount of gas that is blown back through the flow hole 132 by adjusting the degree of pressing the piston 200. As the amount of the gas that is blown back is adjusted, it is possible to finely adjust the amount of the analyte that is discharged through the exhaust port 140 and then collected. As described above, according to the present disclosure, since it is possible to finely adjust the amount of the collected analyte by finely adjusting the degree of pressing the piston 200, the analyte collecting device 10 according to the present disclosure can be especially and usefully used when performing an examination in which it is very important to collect an analyte in a predetermined quantity.

Meanwhile, the flow hole 132 of the blowback portion 130 may be formed in a shape that is open such that the top of the bridge 1324 is communicated with the outside. Accordingly, a cover 134 for selectively sealing the open surface of the bridge 1324 may be further provided. The cover 134 may be made of an elastic material, for example, rubber, and the lower end thereof is formed to correspond to the shape of the bridge 1324 such that when the lower end of the cover 134 is inserted in the bridge 1324, the cover can completely cover and seal the opening of the bridge 1324. The cover 134 can prevent external foreign substances from permeating into the internal space 102 by sealing the flow hole 132, whereby external foreign substances can be prevented from permeating into the internal space 102 not only before processing, but while processing is performed.

In this embodiment, it is exemplified that the flow hole 132 of the blowback portion 130 is formed in an open shape to be communicated with the outside and the opening of the flow hole 132 is sealed by the cover 134, but the spirit of the present disclosure is not limited thereto. For example, the flow hole 132 may be formed in a shape such that the bridge 1342 is not open and is only communicated with the internal space 102 without being communicated with the outside as it is.

The exhaust port 140 may be formed to be communicated with the outside at an end opposite to the opening in which the piston 200 is inserted, and may be formed such that a sample that has undergone predetermined processing in the internal space 102 can be discharged as an analyte from the case 100. To this end, the exhaust port 140 may be formed through one side of the case 100, and as shown in FIG. 2, may be formed at a position facing the blowback portion 130. However, this is only an example and the exhaust port 140 may be formed at a position not facing the blowback portion 130. Further, in this embodiment, although it is exemplified that the exhaust port 140 is formed on the bottom of the internal space 120, the spirit of the present disclosure is not limited thereto and the exhaust port may be formed on a side or the top of the internal space 102. In this case, when an analyte is discharged through the exhaust port 140, a force by gravity is not applied but the analyte can be collected by the pressure due to the blowback phenomenon.

Further, the container coupling protrusion 142 may be formed at the portion where the exhaust port 140 of the case 100 is formed. The container coupling protrusion 142 may protrude from the outer surface of the case 100 and may be formed in a shape extending the exhaust port 140 to the outside of the case 100. Further, the container coupling protrusion 142 may be formed in a shape that can be fastened to the collection container X, and the container coupling protrusion 142 and the collection container X can be fastened to each other by fitting, bolting, or the like. The collection container X may be made of soft plastic, but the spirit of the present disclosure is not limited thereto.

The bed 150 may be formed in the bottom of the case 100 and may be held by a holder 20 to be described below so that the analyte collecting device 100 can be mounted thereon. Further, wings 160 may be formed a both sides of the bed 150. The wings 160 may be formed in a shape protruding throughout the entire width of sides of the case 100 and support both sides of the holder 20 when the bed 150 is held by the holder 20, so the case 100 can be stably held and fixed on the holder 20 by interference of the holder 20 and the wings 160.

Further, a label (not shown) may be attached to sides of the wings 160 or the sides may be used as spaces for writing texts. Accordingly, the analyte collecting apparatus 10 can be systemically managed.

The piston 200 may be provided to be inserted into the internal space 102 through the opening formed at the case 100 and may be provided to reciprocate in the internal space 102. Further, the piston 200 includes at least one partition wall 230 dividing the internal space 102. Further, the piston 200 may further include a center column 210, a piston head 200, a flange 240 and a sealing member 250.

The center column 210, for example, may be provided in a cylindrical shape and is provided to connect the piston head 220 and the partition wall 230. Further, the column 210 may connect a plurality of partition walls 230, and the portion connecting the piston head 220 and the partition wall 230 and the portion connecting the plurality of partition walls 230 may be different in thickness. For example, the thickness of the portion connecting the piston head 220 and the partition wall 230 may be set larger than the thickness of the portion connecting the plurality of partition walls 230, and accordingly, the column 210 may occupy the spaces of the sections 102a, 102b, 102c, and 102d in a limitative manner. However, this is only an example, and the center column 210 may have entirely the same thickness, or the thickness of the portion connecting the plurality of partition walls 230 may be set larger than the thickness of the portion connecting the piston head 220 and the partition wall 230.

The piston head 220 may be connected to an end of the center column 210, and may be provided to be selectively clamped by a clamp 510 of the plunger 50 to be described below. Further, the piston head 220 may be formed in a disc shape having a radius larger than the center column 210, and may be provided as a flange shape for the center column 210.

The partition walls 230 may radially extend from the circumferential surface of the center column 210 to be spaced apart from each other. Further, fourth partition walls 230 may be provided and can divide the internal space into a total of four sections 102a, 102b, 102c, and 102d, but the spirit of the present disclosure is not limited thereto, and a certain number of partition walls may be provided, if necessary.

Figure 5:
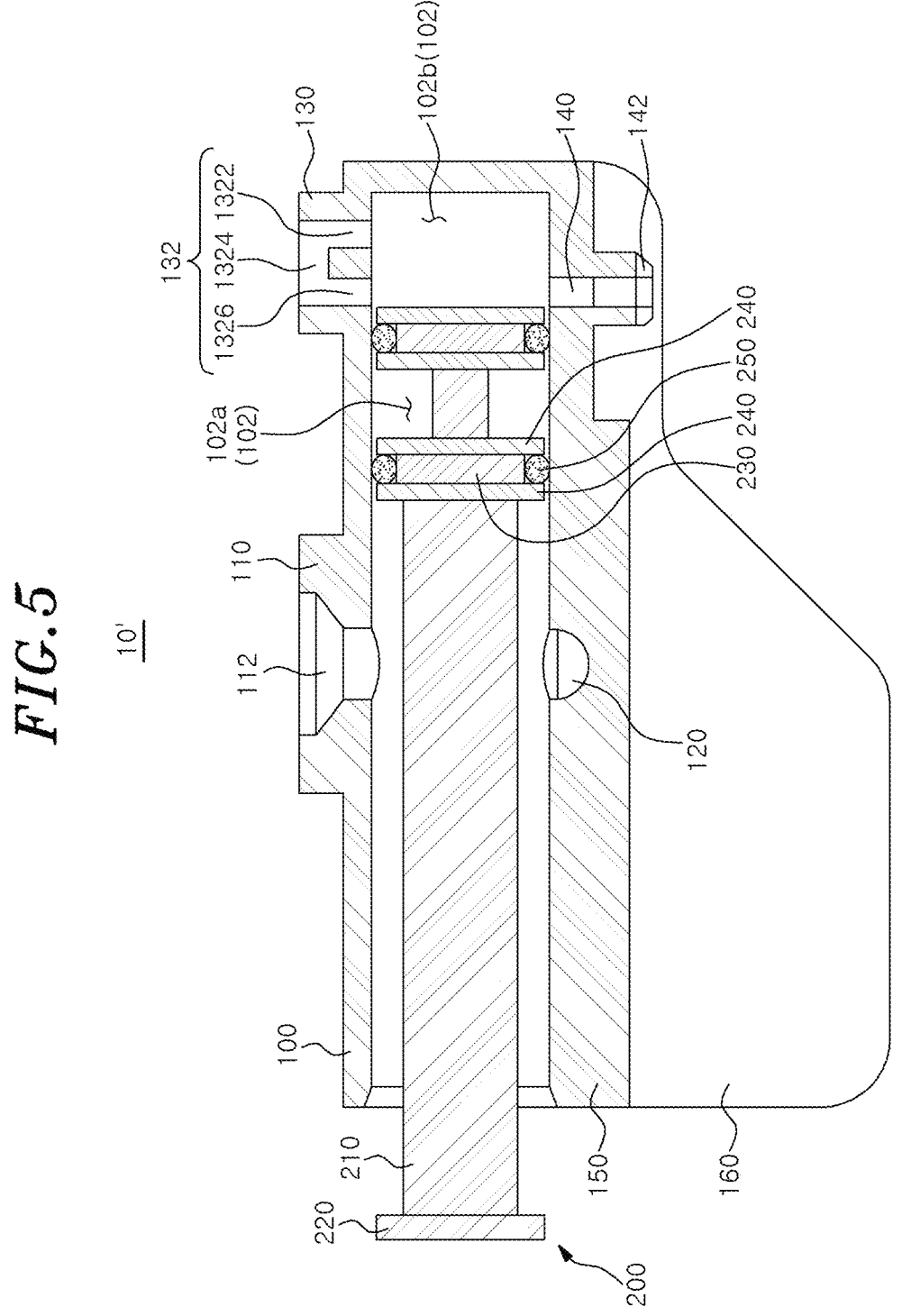
FIG. 5 is a vertical cross-sectional view showing an analyte collecting device according to another embodiment of the present disclosure.

For example, referring to FIG. 5, an analyte collecting device 10' according to another embodiment of the present disclosure is proposed. In this embodiment, unlike the embodiment described above, the number of partition walls 230 may be two, and accordingly, the number of sections 102a and 102b may be two. According to the analyte collecting device 10' having this configuration, only processing by one solution may be performed in the internal space 102 and a plurality of devices may be required for processing that requires a plurality of stages. However, there is the advantage that the size of the devices is correspondingly decreased, the manufacturing cost is reduced, and the devices can be easily used when only one processing is required. However, the spirit of the present disclosure is not limited to the numbers of the partition walls and the sections, and three or more partition walls and sections may be formed, depending on cases.

Referring to FIG. 2 again, the flange 240 may be attached to at least one surface of two surfaces of the partition wall 230 and may be provided such that the circumferential surface is closer to the inner wall forming the internal space 102 of the case 100 than the circumferential surface of the partition wall 230. For example, when the flange 240 and the partition wall are provided in circular disc shapes, the radius of the flange 240 may be larger than the radius of the partition wall 230. Due to this shape of the flange 240, when two flanges 240 are attached to two sides of the partition wall 230, respectively, a space may be formed along the circumference of the partition wall 230 between the two flanges 240. The sealing member 250 may be provided in the space formed in this way.

The sealing member 250 may surround the circumferential surface of the partition wall 230 and may be in contact with the inner wall of the case 100. The sealing member may be an O-ring made of a material such as rubber. By the sealing member 250, the gap between the partition wall 230 and the inner wall of the case 100 can be sealed by the sealing member 250 and the substances accommodated in the sections 102a, 102b, 102c, and 102d can be prevented from leaking from the corresponding sections. Further, even though the piston 200 is moved in the internal space 102, the sealing member 250 may be interfered with by the flange 240, so that the sealing member 250 can keep positioned between the two flanges 240 without separating from the circumferential surface of the partition wall 230.

A process of collecting a sample as an analyte through a process such as refinement and a process of performing a predetermined examination on the collected analyte can be manually performed by the analyte collecting device 100 having the configuration described above, and may be automatically performed by a system 1 for examining an analyte. When the system 1 for examining an analyte is used, precise control is possible, as compared with manual work, so collection and examination of an analyte can be more systematically performed. Hereafter, the system 1 for examining an analyte according to an embodiment of the present disclosure is described.

Figure 3:
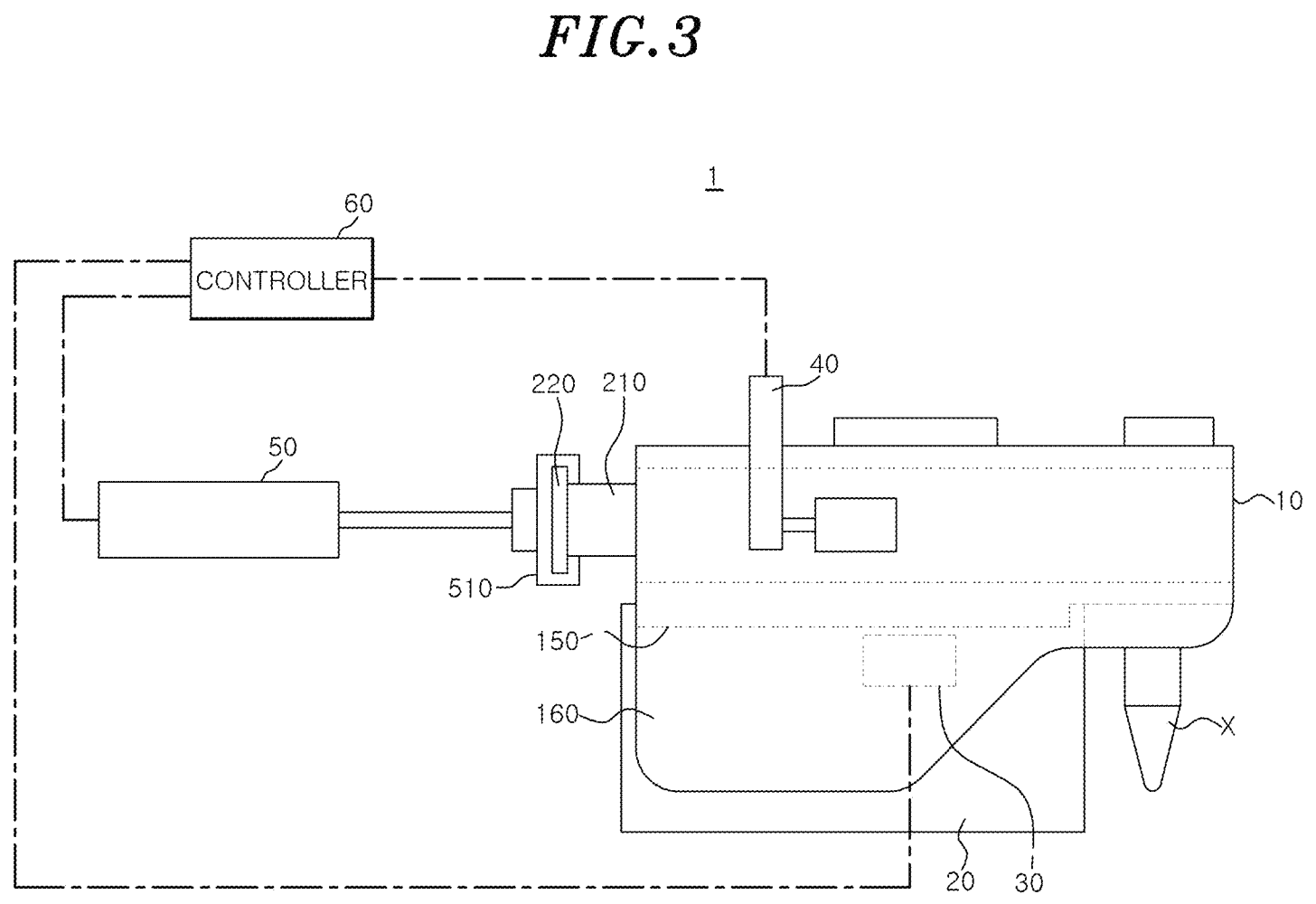

Referring to FIG. 3, the system 1 for examining an analyte according to an embodiment of the present disclosure may be configured to not only perform a predetermined examination on an analyte collected through the analyte collecting device 10, but perform processing, such as refinement, and collection on the analyte. However, depending on cases, the system 1 for examining an analyte may also be configured to perform only processing, such as refinement, and collection on an analyte.

The system 1 for examining an analyte may include a holder 20, an aggregating device 30, a de-aggregating device 40, a plunger 50, and a controller 60.

The holder 20 may be provided to separably hold the analyte collecting device 10. Further, the top of the holder 20 may have a shape that can be fastened to the bed 150 of the analyte collecting device 10. The holder 20 may have a width and a shape that can be inserted in the space between two wings 160. Accordingly, a process for collecting an analyte of the analyte collecting device 10 may be performed with the analyte collecting device 10 mounted by the holder 20.

The aggregating device 30 may be provided to selectively apply a magnetic force toward the aggregating groove 120 of the analyte collecting device 10 so that the magnetic substance in a solution accommodated in the internal space 102 and a substance binding to the magnetic substance can be aggregated in the aggregating groove 120. The aggregating device 30 may be controlled by the controller 60 to be described below and may be provided as a member such as an electromagnet that can be supplied with power and can generate a magnetic force. Further, the aggregating device 30 may be provided inside the holder 20, and may be disposed at a position close to the aggregating groove 120 when the analyte collecting device 10 is mounted in the holder 20.

The de-aggregating device 40 may be provided to selectively apply a magnetic force the internal space 102. The de-aggregating device 40 may be controlled by the controller 60 and may be provided as a member such as an electromagnet that can be supplied with power and can generate a magnetic force. Further, the de-aggregating device 40 may be disposed adjacent to a side of the top of the case 100, and may be operated to apply a magnetic force to the internal space 102 of the case 100 using power supplied from the outside. Accordingly, the controller 60 controls the de-aggregating device 40 with a magnetic substance aggregated in the aggregating groove 120, whereby the magnetic substance aggregated in the aggregating groove 120 and the substance bound to the magnetic substance can be separated by the magnetic force applied to the internal space 102, and accordingly, the substance binding to the magnetic substance can float back into the internal space 102.

The plunger 50 may translate the piston 200 in the internal space 102 by pushing or pulling the piston head 220. To this end, the plunger 50 may include a clamp 510 that can selectively hold the piston head 220. The clamp 510 may have a shape corresponding to the shape of the piston head 220, and may be provided to selectively hold the piston head 220.

The controller 60 may be provided to control the components of the system 1 for examining an analyte. In detail, the controller 60 may be provided to control at least one or more of the holder 20, the aggregating device 30, the de-aggregating device 40, and the plunger 50. The controller 60, for example, may be a small built-in computer and may include programs, a memory, and a CPU that is a data processing unit. The programs may include an algorithm for controlling at least one or more of the holder 20, the aggregating device 30, the de-aggregating device 40, and the plunger 50. Further, the programs may be stored in a computer memory medium, for example, a memory such as a flexible disc, a compact disc, a hard disc, and a magneto-optical disk (MO), and may be installed in the controller 60. For example, predetermined processing that is performed in the analyte collecting device 10 by the system 1 for examining an analyte may include a plurality of stages, and, as the controller 60 controls the operation of the plunger 50, the plurality of stages can be sequentially performed.

Hereafter, the plurality of stages that is performed by the analyte collecting device 10 and the system 1 for examining an analyte is described with reference to FIGS. 4A to 4J. In the following description, although it is exemplified that an analyte that is collected by the analyte collecting device 10 is a refined nucleic acid and includes a specimen for Polymerase Chain Reaction (PCR), the spirit of the present disclosure is not limited thereto, and the analyte collecting device and the system for examining an analyte may be used to collect other kinds of analytes.

Figure 4:
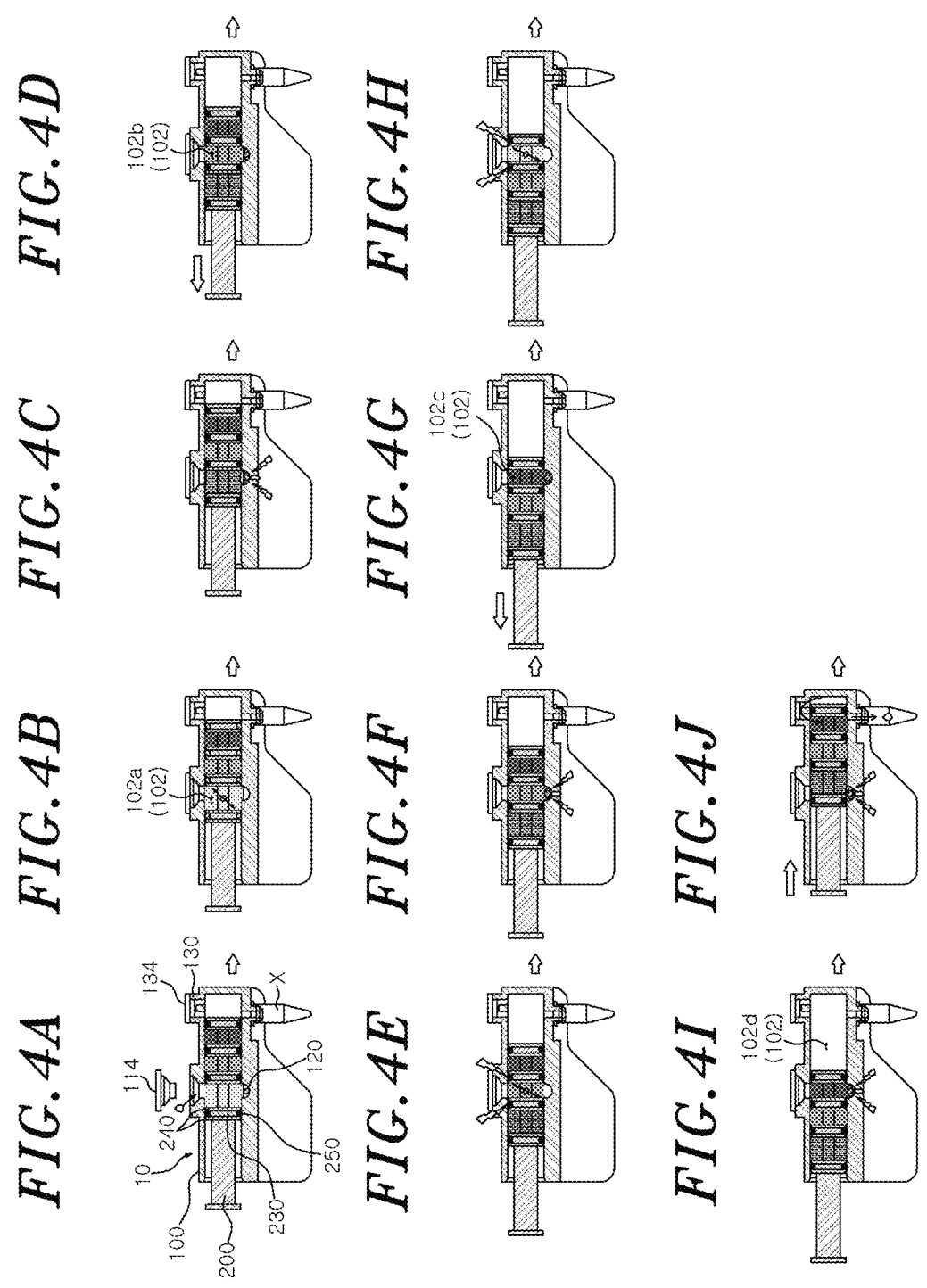
FIGS. 4A to 4J are flowcharts showing a process of refining and collecting an analyte using the analyte collecting device of FIG. 1.

First, a sample can be put into the internal space 102 of the analyte collecting device 10 (see, FIG. 4A). The sample that is put into the internal space 102 may be liquid, solid, or a mixture including some or all of a cell, a virus, a tissue, exosome, protein, nucleic acid, an antigen, and an antibody, and for example, may be a specimen taken from a human body.

Next, the piston 200 is moved in the internal space 102 and predetermined processing including a plurality of stages can be sequentially performed. The stage in which predetermined processing is sequentially performed is described through an example as follows. First, a biomaterial contained in a sample is dissolved by the solution in the first section 102a and nucleic acid in the biomaterial can be bound to a magnetic substance (see, FIG. 4B). Thereafter, the controller 60 applies a magnetic force to the aggregating groove 120 by controlling the aggregating device 30, and the magnetic substance bound to the nucleic acid can be aggregated in the aggregating groove 120 (see, FIG. 4C). After the magnetic substance bound to the nucleic acid is aggregated in the aggregating groove 120, the controller 60 pushes backward the piston 200 such that the second section 102b is disposed over the aggregating groove 120 (see, FIG. 4D).

After finishing moving the piston 200, the controller 60 can remove the magnetic force applied to the aggregating groove 120 by stopping operation of the aggregating device 30 and can apply a magnetic force to the internal space 102 by operating the de-aggregating device 40 (see, FIG. 4E). Accordingly, the nucleic acid and the magnetic substance bound to each other in the aggregating groove 120 can be separated, and the magnetic substance bound to the nucleic acid can float into the internal space of the case. Thereafter, the nucleic acid bound to the magnetic substance can be started to be refined by the solution in the second section 102b.

After a predetermined time for which the nucleic acid can finish being refined passes, the controller 60 can aggregate the nucleic acid bound to the magnetic substance in the aggregating groove 120 by applying a magnetic force to the aggregating groove 120 by operating the aggregating device 30 again (see, FIG. 4F). Thereafter, the controller 60 moves backward the piston 200 by operating the plunger 50, whereby the third section 102c can be disposed over the aggregating groove 120 (see, FIG. 4G).

After finishing moving the piston 200, the controller 60 can remove the magnetic force applied to the aggregating groove 120 by stopping operation of the aggregating device 30 and can apply a magnetic force to the internal space 102 by operating the de-aggregating device 40 (see, FIG. 4H). Accordingly, the nucleic acid and the magnetic substance bound to each other in the aggregating groove 120 can be separated, and the magnetic substance bound to the nucleic acid can float into the internal space of the case 100. Thereafter, a process in which the nucleic acid bound to the magnetic substance is eluted from the magnetic substance by the solution in the third section 102c can be performed.

After a predetermined time for which the eluting of the nucleic acid is completed passes, the controller 60 can aggregate the magnetic substance separated from the nucleic acid in the aggregating groove 120 by applying a magnetic force to the aggregating groove 120 by operating the aggregating device 30 again (see, FIG. 4I). Thereafter, the controller may allow the piston 200 to be pushed toward the end of the internal space 102 in the internal space 102, thereby pushing the third section 102c toward the blowback portion 130 containing the eluted nucleic acid. Further, the nucleic acid pressed toward the blowback 130 can be discharged as an analyte through the exhaust port 140 formed at the case 100 (see, FIG. 4J). In this case, the collecting container X may have been fastened to the container coupling protrusion 142, and the analyte discharged through the exhaust port 140 can be collected in the collecting container X and used for a predetermined examination procedure such as PCR.

Figure 6:
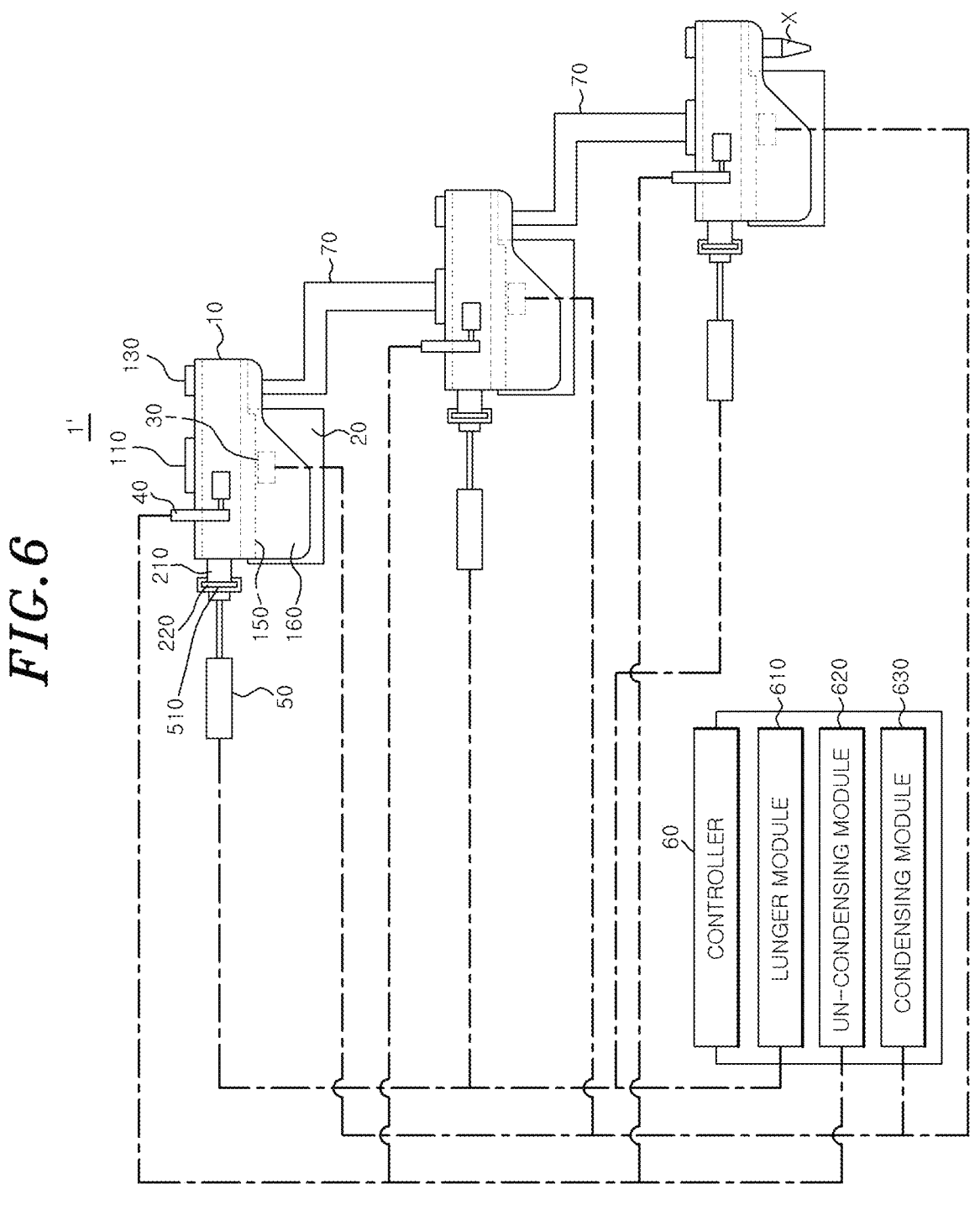
FIG. 6 is a diagram showing a system for examining an analyte according to another embodiment of the present disclosure.

Meanwhile, the system 1 for examining an analyte, as shown in FIG. 3, may be configured such that a single system is controlled by one controller 60, but, as shown in FIG. 6, a plurality of systems may be controlled. In other words, as in the analyte collecting device 10' shown in FIG. 5, when only two sections are provided and one section is filled with a solution for one processing, a plurality of analyte collecting devices 10 may be required to perform processing that should be performed through a plurality of stages. As described above, when it is required to operate a plurality of analyte collecting devices in one process, a system 1' for examining an analyte shown in FIG. 6 may be used.

Hereafter, the system 1' for examining an analyte according to another embodiment of the present disclosure is described.

Referring to FIG. 6, the system 1' for examining an analyte may include a plurality of analyte collecting devices 10 and may include holders 20, aggregating devices 30, de-aggregating devices 40, a plunger 50 to correspond to the number of the analyte collecting devices 10, and may further include conveying lines 70 connecting the analyte collecting devices 10, respectively. In this case, the conveying line 70 may be provided to connect the exhaust port 140 of any one analyte collecting device 10 and the injection hole 112 of another analyte collecting device 10. Accordingly, an analyte processed through the analyte collecting device 10 at the front end is injected into the analyte collecting device 10 at the rear end through the conveying line 70, and following processing can be performed.

Further, although not shown in this embodiment, the conveying line 70 may further have members such as a pump and a valve for conveying fluid. Further, the conveying line 70 may be separably fastened to the analyte collecting device 10, whereby the conveying line 70 can be fastened to the analyte collecting device 10 or the position thereof can be changed, if necessary. However, this is only an example, and the conveying line 70 may be omitted and the analyte discharged from the analyte collecting device 10 at the front end may be manually conveyed to the analyte collecting device 10 at the rear end.

The controller 60 may include a plunger module 610, a de-aggregating module 620, and an aggregating module 630. The plunger module 610 may be connected to the plungers 50 to independently control the plungers 50. Further, the de-aggregating module 620 may be connected to the de-aggregating devices 40 to independently control the de-aggregating devices 40. Further, the aggregating module 630 may be connected to the aggregating devices 30 to independently control the aggregating devices 30. The plunger module 610, the de-aggregating module 620, and the aggregating module 630 may be provided as independent algorithms stored in a chipset module or one chipset disposed in the controller 60.

According to the system 1' for examining an analyte described above, a plurality of systems can be independently controlled, so there is the advantage that the system 1' can be especially and usefully used when a process should be performed through multiple stages.

Figure 7:
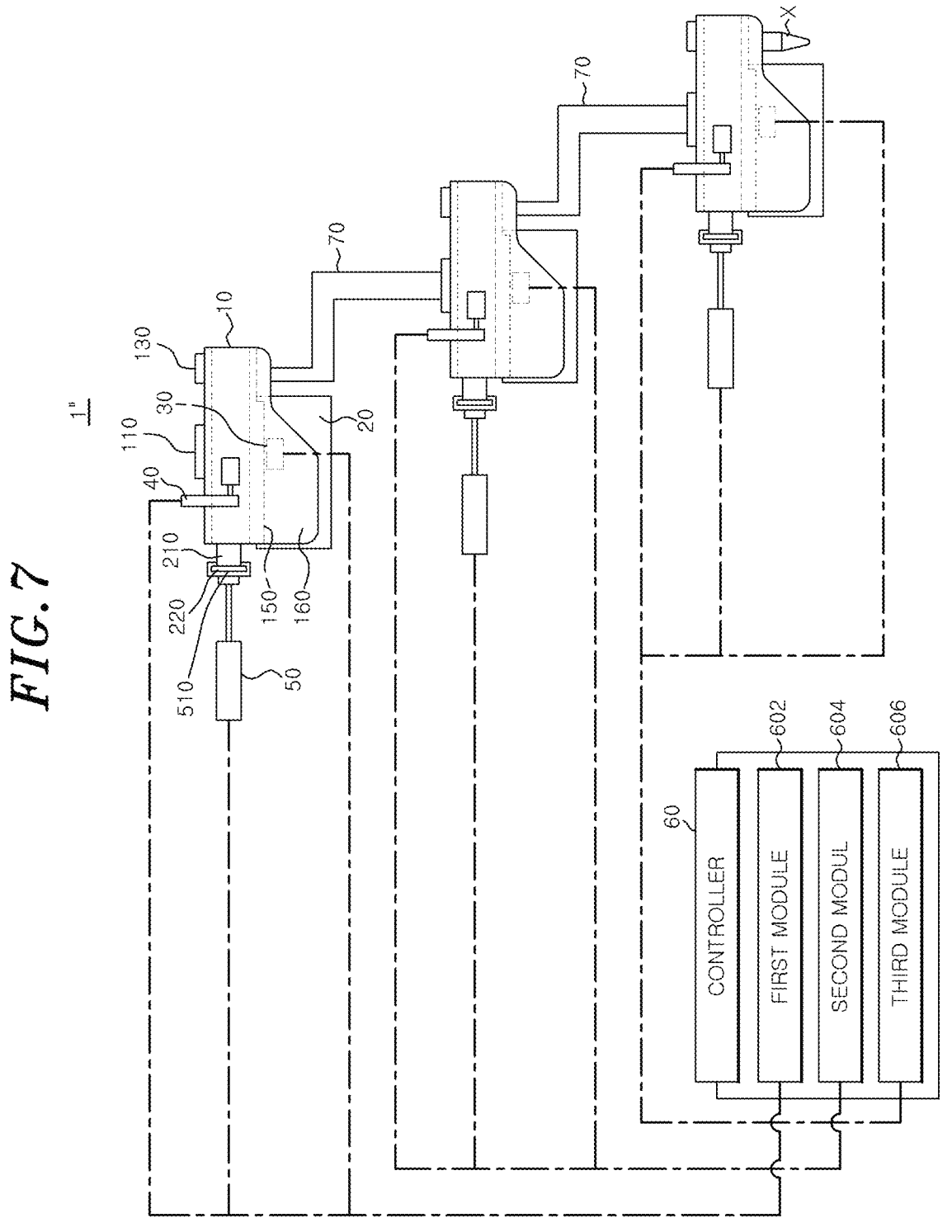
FIG. 7 is a diagram showing a system for examining an analyte according to another embodiment of the present disclosure.

Meanwhile, the configuration of the controller 60 of the system for examining an analyte may be changed in various ways. For example, the configuration shown in FIG. 7 is also possible. Hereafter, the system 1" for examining an analyte according to another embodiment of the present disclosure is described with reference to FIG. 7. In the following description, the system 1" for examining an analyte has a difference in the configuration of the controller 60, as compared with the system 1' for examining an analyte described above, so the difference is mainly described and the system 1' for examining an analyte described above is referred to for the same configuration.

Referring to FIG. 7, the controller 60 of the system 1" for examining an analyte may have a configuration in which modules correspond to systems, respectively, each of which includes one analyte collecting device 10, one holder 20, one aggregating device 30, one de-aggregating device 40, and one plunger 50. For example, when a total of three systems each including one analyte collecting device 10, one holder 20, one aggregating device 30, one de-aggregating device 40, and one plunger 50 are provided, the controller 60 may include a first module 602, a second module 604, and a third module 606 that independently control the systems. Accordingly, there is the advantage that it is possible to easily change the number of low-class systems included in the entire system by removing some of the modules in the controller 60 or adding a new module.

Hereafter, the operation and effects of the analyte collecting devices 10 and 10' and the systems 1, 1', and 1" for examining an analyte having the configurations described above in accordance with embodiments of the present disclosure are described. The applicant of the present disclosure performed examinations in accordance with an experimental example to be described below to prove the effects of the present disclosure.

(Experimental Example)

Figure 8:
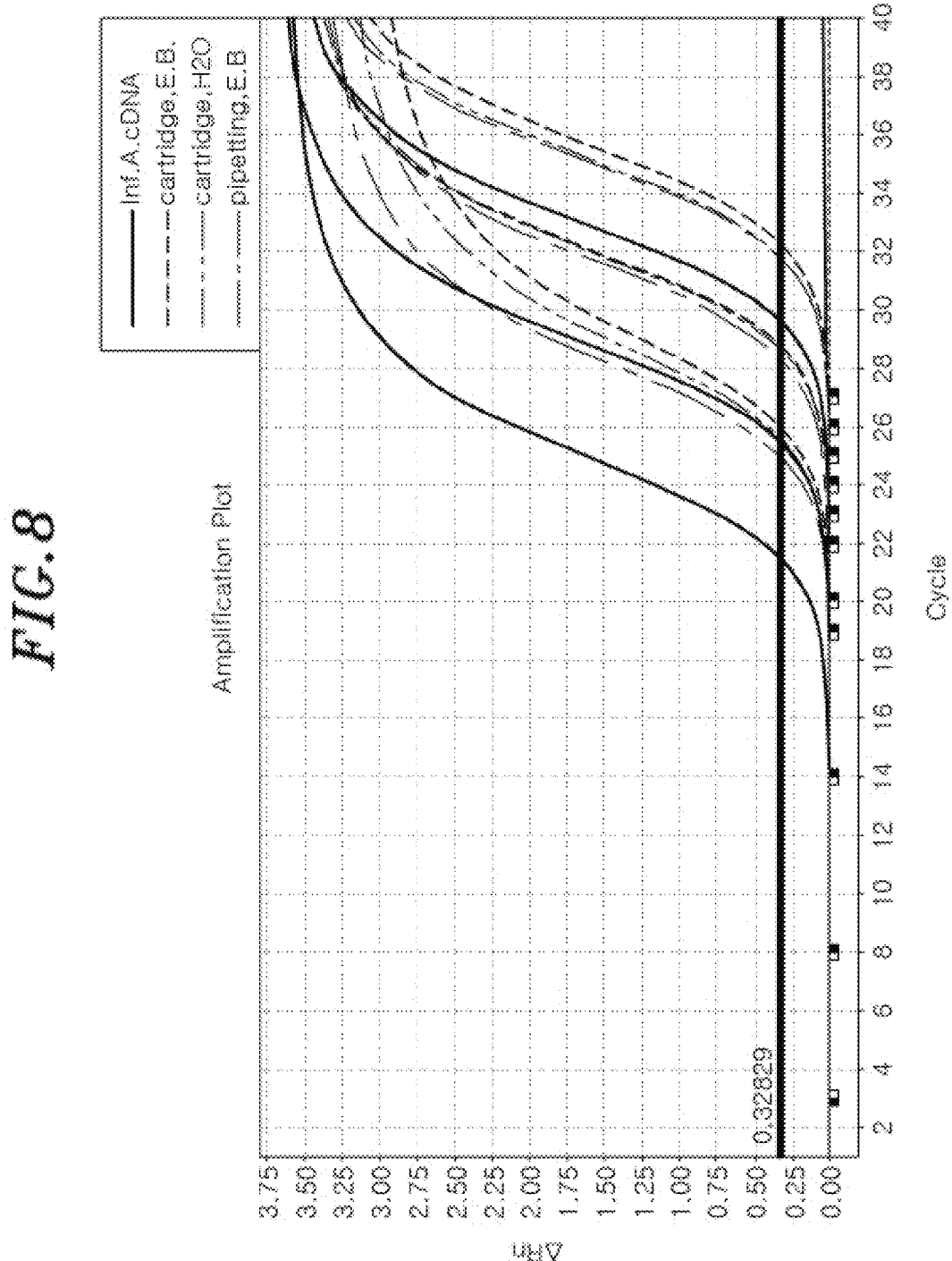
FIGS. 8 and 9 are charts showing an examination result of performing PCR on an analyte collected using the analyte collecting device of FIG. 1.
Figure 9:
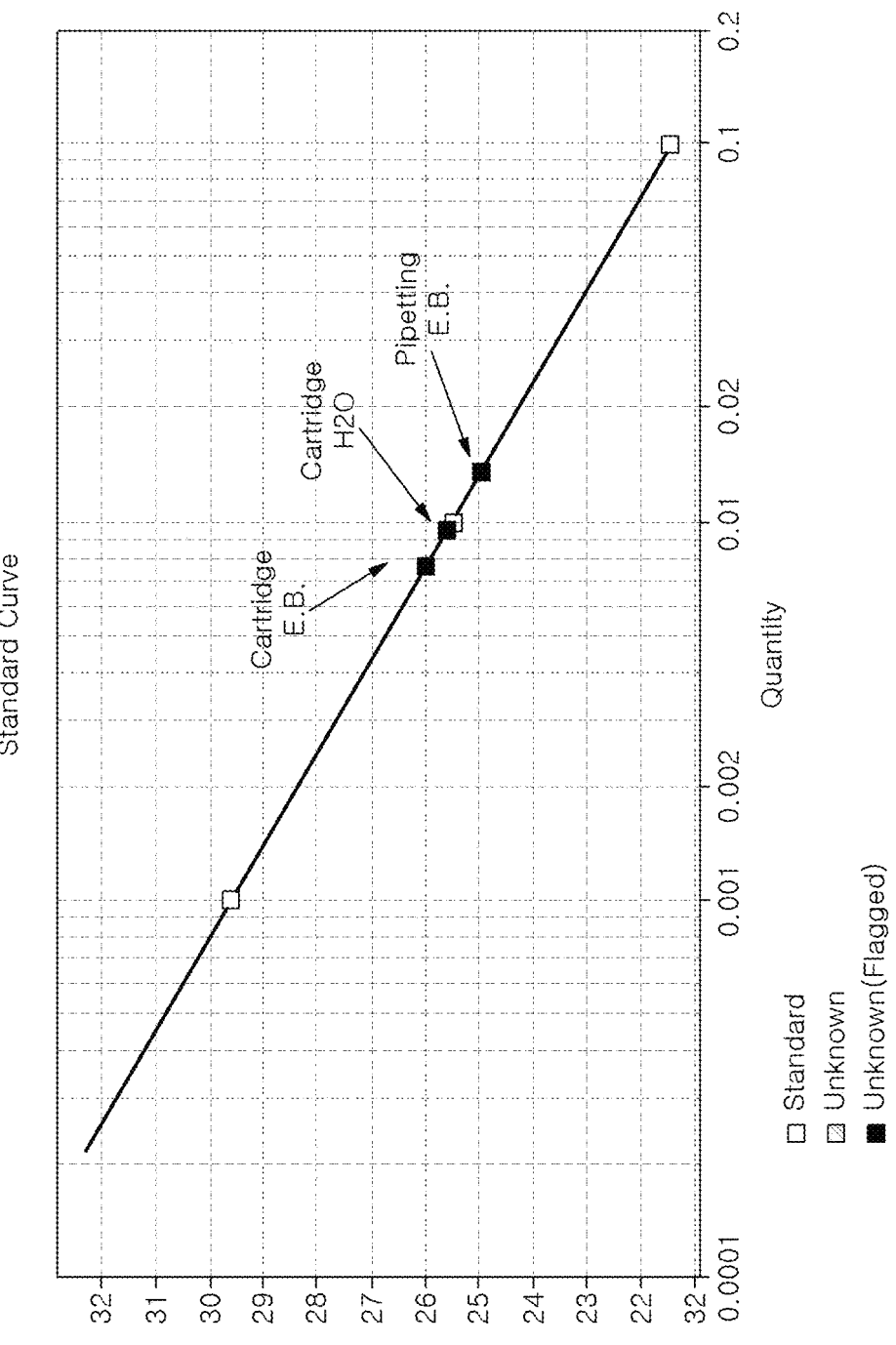

Referring to FIGS. 8 and 9, in this experimental example, an analyte collecting device including a first section 102a, a second section 102b, a third section 102c, and a fourth section 102d was prepared, the capacities of the first to third sections 102a, 102b, and 102c were set as 750, 750, and 550 μL, and the examination was performed in this state. In this experimental example, Influenza A H1N1 (Human, strain: KUMC-76) cDNA was conveyed and PCR of the conveyed resultant was performed using the analyte collecting devices according to the embodiments of the present disclosure, and then the result was measured.

The equipment used for PCR was QuantStudio™ 3 by ThermoFisher Scientific (Applied Biosystems), and the reagent was PowerUp™ SYBR™ Green Master Mix by the same company. The used primer information is as follows.

```
Inf.A_F:
GACCRATCCTGTCACCTCTGAC (22 mer, 10 μM)

Inf.A_R:
AGGGCATTYTGGACAAAKCGTCTA (24 mer, 10 μM)
```

PCR reaction volume was 20 μL, PowerUp™ SYBR™ Green Master Mix was 10 μL, the primer was 1 μL, and a reagent of 8 μL was included for each experiment.

The PCR procedure was composed of a total of three states. First, a hold stage was performed under the condition of 50° C./2 min. and 95° C./10 min, and a cycling stage was performed for 40 cycles under the condition of 95° C./15 sec. and 60° C./60 sec. Finally, in a melt curve stage, a result was measured while temperature was increased by 0.15° C. per 1 seconds after 95° C./15 sec. and 60° C./1 min.

Influenza A H1N1 (Human, strain: KUMC-76) cDNA that is a sample was produced by QuantiNova™ Reverse Transcription Kit by Qiagen.

In the first section 102a, a solution and magnetic particles required for cell dissolution (lysis) and binding of nucleic acid and magnetic particles were injected, and additionally, Dynabeads® MyOne™ Silane (ThermoFisher Scientific, 40 mg/mL) of 50 Lysis/binding Buffer of 300 μL by Dynabeads® SILANE viral NA kit (ThermoFisher Scientific), 2-Propanol (Sigma-Aldrich, 19516-500 mL) of 150 μL, Distilled water (DW) of 244.5 μL were injected.

In the second section 102b, a solution for washing was injected in advance, and Washing Buffer2 of 750 μL by Dynabeads® SILANE viral NA kit (ThermoFisher Scientific) was injected.

In the third section 102c, a solution for nucleic acid elution was injected in advance, and in the cartridge; Elution Buffer of 150 μL and DW of 400 μL by Dynabeads® SILANE viral NA kit (ThermoFisher Scientific) were additionally injected in the E.B. experiment shown in FIGS. 8 and 9, and DW of 550 μL was injected in the cartridge, H₂O experiment shown in FIGS. 8 and 9.

In the first section 102*a* of the analyte collecting device set as described above, Influenza A H1N1 cDNA of 5.5 μL was injected as a sample. Thereafter, analytes were collected in accordance with the methods of collecting an analyte according to the embodiments described above, and PCR was performed by injecting an undiluted solution, a 1/10 diluted solution, and 1/100 diluted solution of 8 μL of the collected analytes were injected in individual PCR contain- ers.

As a contrastive group, the same specimen was made pass through the same solutions as the solutions injected in the first section 102*a* and the second section 102*b*, and finally, pass through the solution in which Elution Buffer of 150 μL and DW of 400 μL were injected. Further, an examiner manually performed the experiment using a pipette (pi- petting, E.B. of FIGS. 8 and 9). Similarly, in the contrastive group, PCR was performed by injecting an undiluted solu- tion, a 1/10 diluted solution, and 1/100 diluted solution of 8 μL of an analyte in individual PCR containers.

As a standard substances in PCR, 1/10, 1/100, and 1/1000 diluted solutions (Inf.A.cDNA of FIGS. 8 and 9) of 8 μL of Influenza A H1N1 cDNA that is the same solution as that injected in each experiment were injected in individual PCR containers, whereby PCR was performed.

Since Influenza A H1N1 cDNA injected in each experi- ment was 5.5 μL and the capacity of the third section 102*c* was 550 μL, when an analyte was 100% conveyed, it corresponds to a 1/100 diluted solution of the standard.

Referring to FIG. 8, it was found that when Influenza A H1N1 cDNA solution conveyed using the analyte collecting devices, systems, and methods according to embodiments of the present disclosure was amplified, the threshold cycle (Ct) values measured in the cartridge, E.B. experiment and the cartridge, H₂O experiment were both similar to the Ct values of the contrastive group of this experimental example and the 1/100 diluted solution of the standard, and the diluted solutions showed the same tendency. The Ct values prove the contrary of the initial cDNA before amplification, so it was determined that collection of an analyte through the analyte collecting devices, systems, and methods according to embodiments of the present disclosure was effective.

Further, referring to FIGS. 8 and 9, it was found that the experiment of injecting distilled water in the third section 102*c* while using the analyte collecting devices, systems, and methods according to embodiments of the present disclosure has the most similar Ct value to the 1/100 of the standard and the initial concentrations before amplification were similar.

According to the analyte collecting devices and systems for examining an analyte having the configurations described above in accordance with embodiments of the present disclosure, there is an effect that the structures of the devices and the systems are simple, so the cost is low and the devices and the systems can be implemented in a small size. Further, a sample can be effectively processed through an automated process and it is possible to achieve a constant yield ratio of an analyte every time regardless of the skill of the users.

The examples of the present disclosure have been described above as specific embodiments, but these are only examples, and the present disclosure is not limited thereto, and should be construed as having the widest scope accord- ing to the technical spirit disclosed in the present specifica- tion. A person skilled in the art may combine/substitute the disclosed embodiments to implement a pattern of a shape that is not disclosed, but it also does not depart from the scope of the present disclosure. In addition, those skilled in the art can easily change or modify the disclosed embodi- ments based on the present specification, and it is clear that such changes or modifications also belong to the scope of the present disclosure.

What is claimed is:

1. An analyte collecting device comprising:

a case including an opening and an internal space; and a piston including one or more partition walls dividing the internal space into a plurality of internal sections, the piston being inserted into the internal space through the opening of the case to reciprocate in the internal space, wherein the case further includes:

a specimen injection port including an injection hole to allow the internal space to communicate with an outside of the case so that a sample can be injected through the injection hole, wherein the specimen injection port further includes a cap configured to seal the injection hole by selectively covering the injection hole, and wherein the injection hole is formed in a side surface of the case to extend in a direction perpendicular to an insertion direction of the piston, wherein the one or more partition walls include four partition walls, wherein the plurality of internal sections include a first section, a second section, a third section, and a fourth section sequentially divided by the four partition walls, the first section to the fourth section being sequentially disposed away from the opening of the case, wherein the first section is filled with a solution config- ured to dissolve a biomaterial contained in the sample and binds at least a portion of an analyte in the biomaterial to a magnetic substance, wherein the second section is filled with a solution configured to wash at least a portion of the analyte bonded to the magnetic substance, wherein the third section is filled with a solution config- ured to elute at least a portion of the analyte bonded to the magnetic substance from the magnetic substance, and wherein the fourth section is formed adjacent to the third section and in contact with an inner end of the case.

2. The analyte collecting device of claim 1, wherein the case includes:

an exhaust port formed at an end portion opposite to a side in which the piston is inserted such that the internal space communicates with the outside of the case, the sample put in the internal space being discharged through the exhaust port to the outside of the case; and a blowback portion provided at the end portion, the blowback portion including a flow hole formed such that both ends thereof communicate with the internal space.

3. The analyte collecting device of claim 2, wherein the sample input in the internal space is config- ured to be discharged through the exhaust port as an analyte after undergoing predetermined processing by the solution in the internal space.

4. The analyte collecting device of claim 3, wherein the solution filled in the first section includes at least one of a lysis/binding buffer or isopropyl alcohol (2-propanol), wherein the solution filled in the second section includes a washing buffer, and wherein the solution filled in the third section includes an elution buffer.

5. The analyte collecting device of claim 1, wherein the piston includes a center column, wherein the one or more partition walls include a plurality of partition walls spaced apart from each other and radially extend from a circumferential surface of the center column.

6. The analyte collecting device of claim 1, wherein the piston further includes:

a flange attached to at least one of two surfaces of each of the one or more partition walls provided perpendicular to the insertion direction of the piston, the flange having a circumferential surface provided closer to an inner wall surrounding the internal surface of the case than the circumferential surface of each of the one or more partition walls; and a sealing member provided to surround the circumferential surface of each of the one or more partition walls and being in contact with the inner wall of the case.

7. The analyte collecting device of claim 1, wherein an aggregating groove is recessed from an inner wall forming the internal space of the case, and wherein the magnetic substance is configured to be aggregated in the aggregating groove in response to a magnetic force being applied toward the aggregating groove from the outside.

8. The analyte collecting device of claim 1, wherein the analyte that is collected by the analyte collecting device includes at least one of nucleic acid, protein, vesicle, lipid, a carbohydrate, a cell, or a substance separated therefrom.

9. The analyte collecting device of claim 1, wherein the injection hole has a conical shape.

10. A system for examining an analyte, the system comprising:

the analyte collecting device of claim 1; and a holder separably holding the analyte collecting device.

11. The system of claim 10, further comprising:

a plunger configured to translate the piston in the internal space by pushing or pulling a head of the piston; and a controller configured to control the plunger.

12. The system of claim 11, wherein the sample put in the case is configured to undergo a predetermined processing by the solution filled in the internal space, and wherein the predetermined processing includes a plurality of stages which are sequentially performed as the controller controls operation of the plunger.

13. The system of claim 12, wherein the case includes:

an exhaust port formed at an end portion opposite to a side in which the piston is inserted such that the internal space communicates with the outside of the case, the sample, which is put in the internal space and undergoes the predetermined processing, being discharged from the case as an analyte; and a blowback portion provided at the end portion, the blowback portion including a flow hole formed such that both ends thereof communicate with the internal space, and wherein the controller is configured to control the plunger to push the piston toward the blowback portion such that the analyte is discharged through the exhaust port by a blowback phenomenon.

14. The system of claim 12, wherein the case has an aggregating groove recessed from an inner wall forming the internal space, and the system further comprises: an aggregating device configured to selectively apply a magnetic force toward the aggregating groove so that the magnetic substance is aggregated in the aggregating groove, the aggregating device being controlled by the controller.

15. The system of claim 14, further comprising:

a de-aggregating device configured to selectively apply a magnetic force to the internal space and being controlled by the controller, wherein the controller is configured to control the de-aggregating device with the magnetic substance aggregated in the aggregating groove so that a magnetic force is applied to the internal space and the magnetic substance aggregated in the aggregating groove is separated.

16. A method of collecting analyte using the analyte collecting device of claim 1, the method comprising:

putting a sample in the internal space; and collecting the sample as an analyte by sequentially performing a predetermined processing including a plurality of stages while the piston is moved in the internal space.

17. The method of claim 16, wherein the case includes:

an exhaust port formed at an end portion opposite to a side in which the piston is inserted such that the internal space communicates with the outside of the case, the sample accommodated in the internal space being discharged through the exhaust port to the outside of the case; and a blowback portion provided at the end portion, the blowback portion including a flow hole formed such that both ends thereof communicate with the internal space, wherein the method further includes discharging the analyte in which the piston moving in the internal space pushes the analyte contained in one of the plurality of internal sections and undergoing the predetermined processing toward the blowback portion formed at the end portion of the case, and the analyte pressed through the blowback portion is discharged through the exhaust port formed at the case.

18. The method of claim 16, wherein an aggregating groove is recessed from an inner wall forming the internal space of the case, and wherein the method further includes aggregating the magnetic substance in the aggregating groove by applying a magnetic force to the aggregating groove.

19. The method of claim 18, wherein the first section is formed closest to the opening of the case, the second section is formed adjacent to the first section with one of the four partition walls therebetween, the third section is formed adjacent to the second section with one of the four partition walls therebetween, and the fourth section is formed adjacent to the third section with one of the four partition walls therebetween, wherein the sample is put in the first section, and wherein sequentially performing the predetermined processing further includes:

binding at least a portion of the analyte in a biomaterial contained in the sample to the magnetic substance by dissolving the biomaterial by the solution filled in the first section;

disposing the second section above the aggregating groove by moving the piston backward after the magnetic substance bound to at least a portion of the analyte is aggregated in the aggregating groove by applying a magnetic force to the aggregating groove;

floating the magnetic substance in the second section in which the magnetic force applied to the aggregating groove is removed, and the magnetic substance aggregated in the aggregating groove is separated and floats into the second section by applying a magnetic force to the internal space;

washing at least a portion of the analyte bound to the magnetic substance by the solution filled in the second section;

disposing the third section above the aggregating groove by moving the piston backward after the magnetic substance bound to at least a portion of the analyte is aggregated in the aggregating groove by applying a magnetic force to the aggregating groove;

floating the magnetic substance in the third section in which the magnetic force applied to the aggregating groove is removed, and the magnetic substance aggregated in the aggregating groove is separated and floats into the third section by applying a magnetic force to the internal space;

eluting at least a portion of the analyte bound to the magnetic substance from the magnetic substance by the solution filled in the third section; and aggregating the magnetic substance with at least a portion of the analyte eluted in the aggregating groove by applying a magnetic force to the aggregating groove.

* * * * *